US010079857B2

(12) United States Patent
Mittig et al.

(10) Patent No.: US 10,079,857 B2
(45) Date of Patent: Sep. 18, 2018

(54) METHOD OF SLOWING DOWN A COMMUNICATION IN A NETWORK

(71) Applicant: Orange, Paris (FR)

(72) Inventors: Karel Mittig, Caen (FR); Nicolas Deschamps, Paris (FR); Hachem Guerid, Bir El Djir Oran (DZ)

(73) Assignee: ORANGE, Paris (FR)

( * ) Notice: Subject to any disclaimer, the term of this patent is extended or adjusted under 35 U.S.C. 154(b) by 260 days.

(21) Appl. No.: 15/107,759

(22) PCT Filed: Dec. 16, 2014

(86) PCT No.: PCT/FR2014/053363
§ 371 (c)(1),
(2) Date: Jun. 23, 2016

(87) PCT Pub. No.: WO2015/097363
PCT Pub. Date: Jul. 2, 2015

(65) Prior Publication Data
US 2016/0337402 A1 Nov. 17, 2016

(30) Foreign Application Priority Data
Dec. 23, 2013 (FR) ...................................... 13 63380

(51) Int. Cl.
*H04L 29/06* (2006.01)
(52) U.S. Cl.
CPC ........ *H04L 63/1491* (2013.01); *H04L 63/145* (2013.01); *H04L 2463/144* (2013.01)
(58) Field of Classification Search
CPC .. H04L 63/14; H04L 63/1441; H04L 63/1491
See application file for complete search history.

(56) References Cited

U.S. PATENT DOCUMENTS 7,784,096 B2 * 8/2010 Kaniyar .................. G06F 21/56
726/22
8,042,180 B2 * 10/2011 Gassoway .............. H04L 43/00
726/22

(Continued)

FOREIGN PATENT DOCUMENTS

EP        2472822 A2      7/2012
WO    2007050244 A2      5/2007

OTHER PUBLICATIONS

International Search Report dated Mar. 11, 2015 for corresponding International Application No. PCT/FR2014/053363, filed Dec. 16, 2014.
David Dagon et al., "Modeling Botnet Propagation Using Time Zones", Jan. 1, 2006 (Jan. 1, 2006), XP055143960.
L. Haig, "LaBrea—A New Approach to Securing Our Networks", Mar. 7, 2002 (Mar. 7, 2002), XP002730576.

(Continued)

*Primary Examiner* — Khang Do
(74) *Attorney, Agent, or Firm* — David D. Brush; Westman, Champlin & Koehler, P.A.

(57) ABSTRACT

Method of forestalling attacks in a network, by slowing down a communication in a network including at least one computer including malware aimed at establishing a communication with a control server. The method includes: reception of a request to transfer data originating from the computer, indicating that the IP address of the security server has been provided to the computer in response to a domain name resolution request including a domain name associated with the IP address of the control server, the domain name being included in a black list; waiting for a smaller duration than an expiry period for a transport protocol transporting packets of the communication, a session being maintained during this expiry period in the event of inactivity; and dispatching a packet including a byte generated pseudo-randomly so as to maintain the session active.

11 Claims, 3 Drawing Sheets

(56) References Cited

U.S. PATENT DOCUMENTS

| | | | | |
|---|---|---|---|---|
| 9,015,839 | B2* | 4/2015 | Ibatullin | G06F 21/554 |
| | | | | 726/23 |
| 9,027,135 | B1* | 5/2015 | Aziz | H04L 63/1408 |
| | | | | 726/23 |
| 9,875,355 | B1* | 1/2018 | Williams | G06F 21/56 |
| 2011/0167495 | A1* | 7/2011 | Antonakakis | G06F 21/577 |
| | | | | 726/24 |
| 2012/0303808 | A1* | 11/2012 | Xie | H04L 63/0236 |
| | | | | 709/225 |
| 2012/0323381 | A1* | 12/2012 | Yadav | H04L 63/0236 |
| | | | | 700/286 |
| 2012/0324113 | A1 | 12/2012 | Prince et al. | |
| 2013/0133072 | A1* | 5/2013 | Kraitsman | H04L 63/1408 |
| | | | | 726/23 |

OTHER PUBLICATIONS

Written Opinion dated Mar. 11, 2015 for corresponding International Application No. PCT/FR2014/053363, filed Dec. 16, 2014.
Information Sciences Institute, "DARPA Internet Program, Protocol Specification", prepared for Defense Advanced Research Projects Agency, Information Processing Techniques Office, Sep. 1981, RFC791.
Information Sciences Institute, "DARPA Internet Program, Protocol Specification", prepared for Defense Advanced Research Projects Agency, Information Processing Techniques Office, Sep. 1981, RFC793.
English translation of the International Written Opinion dated Mar. 11, 2015 for corresponding International Application No. PCT/FR2014/053363, filed Dec. 16, 2014.

* cited by examiner

METHOD OF SLOWING DOWN A COMMUNICATION IN A NETWORK

CROSS-REFERENCE TO RELATED APPLICATIONS

This Application is a Section 371 National Stage Application of International Application No. PCT/FR2014/053363, filed Dec. 16, 2014, the content of which is incorporated herein by reference in its entirety, and published as WO 2015/097363 on Jul. 2, 2015, not in English.

FIELD OF THE DISCLOSURE

The invention relates to the general field of telecommunications. It concerns more particularly protection against attacks generated in a network from a plurality of computers commanded by a server controlled by an attacker.

BACKGROUND OF DISCLOSURE

It has a particularly useful application in the context of network security, and notably in protecting against attacks emanating from computers infected by malware and organized in a network. The English term "botnet" is usually used to designate such a network of infected computers remotely controlled by attackers without the knowledge of the legitimate users of the computers. Botnets are usually used to send unsolicited communications (usually referred to as "spam"), for perpetrating phishing attacks, according to the English term, intended to retrieve personal information, or for benefiting from the computing power offered by the computers on the network for performing distributed computing operations, e.g. for breaking passwords, etc.

Such a network of infected computers is commanded by a command server managed by an attacker. The role of this command server is to enable instructions to be sent to the infected computers of the botnet, such as orders to attack or update instructions, or to collect information stolen by the malware installed on the computers of the botnet without the knowledge of the legitimate users. In order to communicate with their command server, the infected computers of the botnet, more precisely the malware installed on these computers, need to localize it. Most of the time they use the "DNS" ("Domain Name System" in English) protocol which can be used to obtain from a domain name associated with a machine, here the command server, the IP address of this machine. In a first case, the computers have stored the domain name of the command server. However, having a fixed domain name facilitates identifying the attacker and setting up countermeasures intended to overcome attacks emanating from the network of infected computers. In a second case, more widespread, the infected computers use pseudo-randomly generated domain names. The command server and the infected computers thus share the same domain name generation algorithm. The command server reserves a few domain names generated by this algorithm, i.e. it registers with a DNS server on the network an association between the few names that it wishes to reserve and the IP address of the command server. An infected computer then sends successive resolution requests with the pseudo-randomly generated domain names until receiving a response from the DNS server specifying an IP address that corresponds to the IP address of the command server. These few reserved domain names constitute meeting points between the infected computers and the command server. The meeting points enable the attackers to make their botnet more resilient to conventional countermeasures.

Clearly in order to overcome the attacks emanating from a botnet, it is important to localize and paralyze communications between the command server of the botnet and the infected computers. Currently, several methods exist.

A first known method is to set up a black list of malicious domain names in the DNS servers of the Internet access providers. The black list is constructed, for example, by disassembling the malware code and by obtaining the pseudo-random domain name generation algorithm. Resolution requests relating to domain names that appear in the black list may thus be intercepted by the DNS server, and retransmitted to a security server for processing. An invalid IP address or a DNS error may then be provided in response to the resolution request. However, in the event of a connection failure or DNS error, the malware tests other possible meeting points until it ends up at a valid meeting point.

Another known method consists, following a DNS request concerning a domain name appearing in the domain name black list, in responding to the resolution request by sending the IP address of a security server controlled by a security administration entity. The security server then replaces the control server of the attacker in communication with the infected computers. The malware then attempts to establish a connection with the security server believing it is being connected to the command server. The security server then makes use of this connection and sends commands to the infected machines in order to disrupt, or even block the operation of the malware. This solution has the advantage that the malware does not seek to connect to another meeting point. However, a parry set up by attackers consists in using encrypted connections, with encryption keys shared between the command server and the malware of the infected machines. Thus, a security server which attempts to establish a connection with an infected computer cannot communicate with this computer since it does not have the necessary keys for the encryption/decryption of communications with the infected computer. The infected computer, detecting that it is not in dialog with the command server then seeks to connect to another meeting point.

Currently, there is no satisfactory solution for countering attacks originating from computers organized in a "botnet" and commanded by a command server controlled by an attacker.

SUMMARY

An exemplary embodiment of the invention provides a method of slowing down a communication in a network including at least one computer, said computer including malware aimed at establishing a communication with a command server, said method including the following steps, implemented by a security server on the network:
  reception of a request to transfer data originating from the computer, said reception indicating that the IP address of the security server has been provided to the computer in response to a domain name resolution request including a domain name associated with the IP address of the command server, said domain name being included in a domain name black list,
  characterized in that it also includes:
  a step of waiting for a duration of less than a timeout period for a transport protocol transporting communication packets, a session being maintained during this timeout period in the event of inactivity, a step of sending a packet including a pseudo-randomly generated byte of data in order to maintain the session active.

Thus, the invention can be used to maintain an active connection between the security server and the infected computer, more precisely with the malware of the computer, for a very long period. Since a minimum volume of data is transmitted to the malware, the latter only detects that it is communicating with a server other than its command server after a significant period of time. Thus, as long as the connection remains active, the malware does not attempt to connect to other meeting points. The method applies in the same way in the case where the communications between the infected computer and its command server are encrypted since the malware only decrypts the data received when it has received a certain volume of data.

With the method described, the connection may thus be maintained active for several days. The method therefore reduces the efficiency of the algorithms for generating dynamic meeting points. It has the effect of paralyzing the activities of the botnet and therefore helps to reduce its harmful impact on networks.

In one embodiment, the method includes at least one iteration of the steps of waiting and sending a packet until closure of the session by the computer.

The session between the computer and the security server is maintained active until the computer detects that it is not communicating with its command server. By sending a single byte in the course of a period less than but close to the timeout period of the transport protocol used and by repeating this sending, clearly the session may be maintained active over a very long period, which may go up to several days.

In one embodiment, the method further includes:
- a step of receiving a domain name resolution request,
- a step of verifying that the requested domain name belongs to the domain name black list,
- a step of sending, in response to the request, the IP address of the security server.

In this embodiment, the method implements the steps relating to the resolution of domain names and notably the step consisting in verifying that the requested domain name does or does not belong to the domain name black list. Thus, a device that implements the method incorporates a DNS relay function capable of verifying the black list. With this embodiment, the method may be implemented in an item of security equipment and therefore does not need to modify the DNS servers in the network. Thus, the impact of the method on the existing network is limited.

In one embodiment, the request to transfer data is compliant with the TCP protocol.

The TCP transport protocol is very widely used by malware that infects the computers in a botnet. Indeed, much of this software is based on the HTTP protocol and in the majority of cases the command servers are pirated websites. The method described here is therefore applicable to many cases of attack by botnet.

In the event that the TCP protocol is used, in one embodiment, the duration is between one and two minutes.

The timeout period of the TCP protocol defined in RFC793 is 5 minutes. However, the timeout period may be defined differently by the malware. With a timeout duration set between 1 and 2 minutes, there is a strong probability that this duration is less than the TCP timeout period set where applicable by the malware. Thus, there is a strong probability that with a timeout duration between 1 and 2 minutes, the method is effective in the majority of cases of attack by botnet.

In another embodiment, the request to transfer data is compliant with the UDP protocol.

While most malware uses the TCP and HTTP protocols for communicating with its command server, some uses proprietary protocols over the UDP protocol in order to make it difficult to detect. The embodiment based on the UDP protocol applies to this type of malware. Thus, the method also applies to malware that uses the TCP protocol.

In the event that the UDP protocol is used, in one embodiment, the header of the packet sent in the course of the step of sending includes a field indicating that an IP fragmentation is implemented.

In the event that IP fragmentation is implemented, the infected computer which receives the packet sent by the security server is placed in waiting for the following IP packets for a duration of 1 to 2 minutes, then it reassembles the message from the received packets before presenting it to an application. This mechanism thus enables the infected computer to be artificially maintained in a waiting state on the UDP protocol. This improves the effectiveness of the method in the case of the UDP protocol.

The invention also concerns a security server on the network, intended to slow down a communication in a network including at least one computer, said computer including malware aimed at establishing a communication with a command server, said security server including:
- means of receiving a request to transfer data, arranged for receiving a request to transfer data originating from the computer, the reception of said request indicating that the IP address of the security server has been provided to the computer in response to a domain name resolution request including a domain name associated with the IP address of the command server, said domain name being included in a domain name black list,
- waiting means, arranged for waiting for a duration of less than a timeout period for a transport protocol transporting communication packets, a session being maintained during this timeout period in the event of inactivity,
- packet sending means, arranged for sending a packet including a pseudo-randomly generated byte of data in order to maintain the session active.

In one embodiment, the security server includes:
- means of receiving a domain name resolution request, arranged for receiving a domain name resolution request,
- means of verifying, arranged for verifying that the requested domain name belongs to a domain name black list,
- address sending means, arranged for sending, in response to the request, the IP address of the security server.

The invention also concerns a residential gateway on the network including a security server according to the invention.

The invention also relates to a computer program intended to be installed in a memory of a security server, including instructions for the implementation of the steps in the method of slowing down a communication in a network as previously described, when the program is executed by a processor of the security server.

The invention also concerns a data medium on which the program as claimed in claim 11 is recorded.

BRIEF DESCRIPTION OF THE DRAWINGS

Other features and advantages of the present invention will be better understood from the description and accompanying drawings among which.

DETAILED DESCRIPTION OF ILLUSTRATIVE EMBODIMENTS

Figure 1:
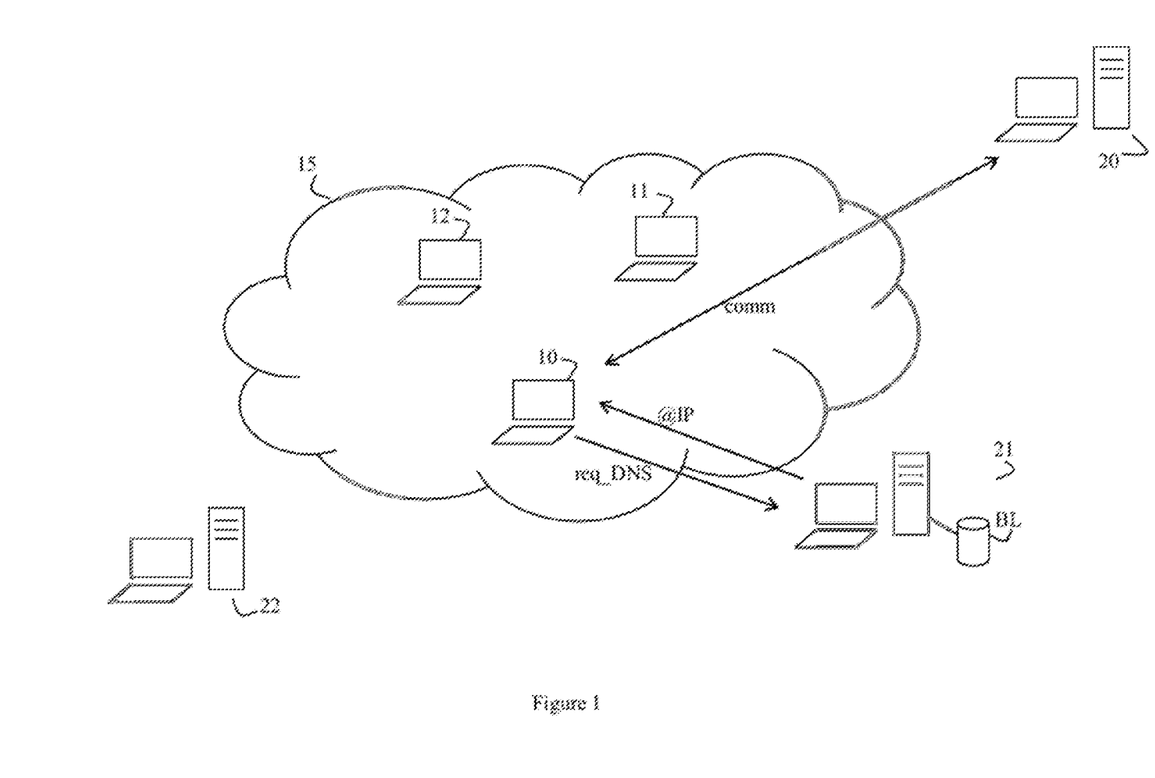
FIG. 1 depicts a security architecture, according to one embodiment of the invention.

A network architecture implementing the method of slowing down a communication in a network, according to a first embodiment of the invention, will now be described in relation to FIG. 1.

Computers 10, 11, 12, for example user terminals, that a malicious person or attacker controls, form part of a network 15 of infected computers (the term usually used for this kind of network is the English term "botnet"). The attacker, who has taken control of the computers of the botnet commands the various infected computers by means of a command server 20. For taking control of the computers 10, 11, 12, the attacker has installed without the knowledge of the legitimate users of the computers 10, 11, 12 one or more pieces of malicious software (known as malware in English), or viruses, intended to enable the attacker to interact with the infected computers 10, 11, 12 and to command them through the command server 20. The malware thus enables the attacker to command the infected computers 10, 11, 12, e.g. by sending instructions to the computers 10, 11, 12, orders for attacking another machine (not represented), or instructions for updating; it can also be used to steal information on the infected computers 10, 11, 12, e.g. personal user data, intended to be used by the attacker for fraudulent purposes.

In order to establish a communication between one of the infected computers 10, 11, 12, e.g. the computer 10 and the command server 20, it is usual for a communication to be established at the initiative of the malware, therefore from the infected computer 10, to the command server 20 in order that the malware, therefore the infected computer 10, connects to the command server 20.

This communication is established conventionally through the Internet. It is usual for the malware to be programmed for calculating domain names by means of a pseudo-random generation algorithm, and for sending successive DNS requests including these domain names to a DNS ("Domain Name System" in English) server 21, until it obtains a valid IP address in response. Indeed, as part of setting up a botnet it is usual, for overcoming possible countermeasures implemented in the network and designed to protect the network infrastructures against attacks by botnet, for a plurality of domain names to be calculated, both by the command server 20, and by the malware, and for some of these domain names to be previously reserved by the attacker and associated in the DNS server 21 with the IP address of the command server 20. Thus, the command server 20 has stored the same pseudo-random domain name generation algorithm and has previously reserved multiple domain names generated by means of this same algorithm. Reserving a domain name is understood to mean registering with the DNS server 21 a correspondence between an IP address, in this case the IP address of the command server 20 and a comprehensible and easy to remember domain name, or "FQDN" ("Fully Qualified Domain Name" in English), e.g. www.monsite.fr. These domain names previously reserved with the DNS server 21 constitute meeting points via which the infected computer 10 and the command server 20 are likely to communicate. When the malware sends a DNS request which includes a domain name that has not been previously registered in the DNS server 21, it receives a DNS error in response.

The DNS server 21 is, for example, a DNS server of an Internet Access Provider (or "IAP"). It is responsible for resolving domain names. It is known that when the DNS server 21 receives a resolution request, it first verifies whether it has in cache memory the IP address associated with the requested domain name. If this is not the case, it is known that it is directed to another DNS server on the Internet in order to request resolution. For reasons of legibility, only the DNS server 21 is represented. The infected computers 10, 11, 12 are parameterized for sending all DNS requests req_DNS to the DNS server 21. In the embodiment described here, the DNS server 21 is suitable for storing a domain name black list BL. Furthermore, it includes code instructions for comparing a domain name included in a DNS resolution request that it receives with the black list BL that it has stored and for responding to the request with an IP address of a security server 22 when the domain name received in the request appears in the domain name black list BL.

The domain name black list BL is generated in accordance with a known method. A first method is based, after identification of an infected machine, on the implementation of a disassembly of the code of the malware that infects the machine and the identification in this code of the instructions of the domain name generator (normally referred to as "reverse engineering" in English). A second method provides, after identification of an infected machine, for activating the malware and monitoring the network exchanges that it initiates in order to identify the DNS links that it attempts to establish, and to retrieve the domain names that appear in the DNS requests that it sends. A third method provides for monitoring and analyzing DNS traffic in a network, and more precisely DNS error traffic, i.e. DNS requests that cause a DNS error. These errors result from DNS requests that include domain names that are not registered in the DNS servers on the network. In normal network traffic, it is estimated that the error rate in DNS requests is of the order of 10%. In a network that includes a plurality of infected computers organized in a botnet, this error rate is much higher than 10%. Thus, when the DNS request error rate is abnormally high, an in-depth analysis of the requests is implemented. When the analysis of the DNS requests issued by computers shows similarities, then it is considered that these computers are infected by the same malware. The domain name black list BL is then constructed from the domain names included in the DNS requests issued by the computers identified as being infected by the same malware. In one embodiment, this black list BL is generated by another security server (not represented in FIG. 1) controlled by the IAP, or by a security entity not represented, then transmitted to the DNS server 21 for registration. The other security server may regularly update the black list and transmit it to the DNS server 21 in order for it to be refreshed. In another embodiment, the other security server is the security server 22.

The security server 22 is a server controlled by a security administrator, e.g. an administrator of the IAP involved in setting up security solutions in its network. The security server 22 is suitable for implementing security measures during a network attack originating from computers organized in a botnet, such as the network 15 of infected computers. The security server 22 includes code instructions for implementing the steps of a method of slowing down a communication in a network as described below.

The steps of a method of slowing down a communication in a network, according to a first embodiment will now be described, in relation to FIG. 2.

It is assumed that the domain name black list BL associated with the malware infecting the computers 10, 11, 12 which form part of the botnet 15 has been previously generated and is stored in a memory of the DNS server 21. In the example illustrated in FIG. 2, only the infected computer 10 is represented.

A preparatory phase is intended to identify malware requests for connection to the command server 20, and to intercept these requests so as to redirect them to the security server 22. Such a redirection is intended to establish a communication between the computer 10, more precisely the malware of the computer 10, and the security server 22, leading the malware to believe that it is connected to the command server 20.

This preliminary phase includes a plurality of steps.

Thus, in an initial step E0 of sending a request, the computer 10, more precisely the malware installed on the infected computer 10, sends a domain name resolution request req_DNS including a domain name dname to the DNS server 21. The domain name dname has been pseudo-randomly generated on the computer 10 by means of generation software shared by the malware and the command server 20. For example, the resolution request includes a domain name of the form "kljdgierg.co.ru". The request is received by the DNS server 21 on the network in a step E1 of receiving.

The network DNS server 21 interrogates the black list BL and verifies, in a step of testing E2, whether the domain name dname which appears in the request belongs to the black list BL.

In one case where the name does not belong to the domain name black list BL (branch "nok" in FIG. 2), then the DNS server 21 proceeds to resolve the domain name conventionally and in a step E3 of responding sends to the computer 10 a response that includes the IP address associated with the domain name if a registration corresponding to the domain name has been able to be identified. It sends a DNS error if the resolution fails.

In a second case where the domain name forms part of the domain name black list BL (branch "ok" in FIG. 2), in a step E4 of responding the DNS server 21 sends a response that includes the IP address of the security server 22. Thus, the IP address of the security server 22 is associated in the DNS server 21 with all the domain names that appear in the black list BL. The response is received by the infected computer 10 in a step E5 of receiving.

In a first embodiment, the computer 10, more precisely the malware, uses the "TCP" ("Transmission Control Protocol" in English) transport protocol which transports the packets of a communication. The TCP protocol is a transport protocol of layer 4 of the OSI ("Open System Interconnection" in English) model which operates in connected mode, i.e. a session is established between two parties who wish to exchange data, here the infected computer 10 and the command server 20.

In steps E6 and E7 of establishing a connection, the computer 10 sends an IP packet that includes, in the recipient field of the packet, the IP address obtained in the course of step E5 of receiving, and in the data part, a connection request. Thus, the infected computer 10, which has obtained the IP address of the security server 22 in response to the request for a domain name associated with the command server 20 sends the connection request to the security server 22. The connection request sent to the security server 22 is compliant with the TCP protocol and therefore includes the sending of a "SYN" packet from the infected computer 10 to the security server 22. The security server 22 sends an acknowledgment in the form of a "SYN-ACK" packet to the infected computer 10. The infected computer 10 then sends an "ACK" packet corresponding to an acceptance message to the security server 22. At the end of steps E6 and E7 of establishing a connection, the infected computer 10 and the security server 22 have established a session and are able to communicate.

In a next step E8 of issuing a request to transfer data, the infected computer 10 sends a request req which includes one or more IP packets. The request req includes, for example, an update request, a command request, or a set of stolen data on the infected computer 10. The security server 22 receives the request req in a step E9 of receiving. Optionally, the request req is stored by the security server 22 for a future analysis.

In a next step E10 of waiting, the security server 22 is placed in waiting for a timeout duration. For this purpose, it sets a timer T, equal to the timeout duration, and remains in waiting. The timeout duration is parameterized to be the longest possible while being less than a timeout period associated with the TCP protocol at the end of which the TCP connection is cut off in the event of inactivity. In other words, in the event of inactivity, the communication session established by means of the TCP protocol is maintained for the timeout period. The TCP timeout period defined in "RFC793" ("Request For Comments" in English) is by default 5 minutes; however, it may be specified by an application that uses TCP and may therefore be shorter. In the example described here, the timeout duration is between 1 and 2 minutes.

In a step E11 of sending data, implemented on the timeout of the timer T, the security server 22 pseudo-randomly generates a single byte of data and sends a message which includes the generated byte to the infected computer 10. The byte is received by the infected computer 10 in the course of a step E12 of receiving. Steps E10 and E11 are then repeated: the security server 22, following the sending of data performed in the course of step E9, goes to step E10 of waiting in the course of which the timer T is reset. In the next repeated step E11, the security server 22 pseudo-randomly generates a byte of data and sends the packet to the infected computer 10.

Thus, the security server 22 places the TCP connection in waiting, before cyclically regenerating a pseudo-random byte which it sends to the infected computer 10.

Thanks to this cyclic sending of a byte, the TCP connection established with the malware of the computer 10 remains open during a period which may be very long, without generating any timeout in the TCP protocol layer. On the side of the infected computer 10, more precisely of the malware hosted by the computer 10, a minimum volume of data prevents it from quickly detecting that the security server 22 with which it is communicating is not the command server 20. Indeed, it will wait until it has received a significant quantity of data before processing this data and interpreting it, and possibly realizing that the data is not usable and does not originate from the command server 20. This remains true in the case where the communication usually used between the infected computer 10 and the command server 20 is encrypted.

The timeout duration takes on its full significance here. Indeed, the longer the timeout duration, the less the security server 22 sends data to the infected computer 10, and the less chance there is that the infected computer 10 quickly detects that the data that is sent to it is not significant.

It is known that more than 80% of existing viruses/malware use the TCP protocol. For example, many viruses are based on the "HTTP" ("HyperText Transfer Protocol" in English) protocol. Indeed, the command servers are on pirated websites most of the time. Thus, the process described here is applicable to many viruses.

The example described here is based on the use of the TCP protocol. Although the invention applies particularly well to software that uses the TCP protocol, it is not limited to this transport protocol. In another embodiment, the method is implemented when the malware is based on the "UDP" ("User Datagram Protocol" in English) transport protocol. The UDP protocol is suitable for enabling the communication of data between two entities in a simple manner. Unlike the TCP protocol, it operates without negotiation: there is therefore no implementation of steps E6 and E7 for establishing a connection in this embodiment.

In step E8 of issuing a request to transfer data, the infected computer 10 sends a request req which includes one or more IP packets.

In the next step E10 of waiting, the security server 22 is placed in waiting for a timeout duration defined for the UDP protocol. For this purpose it sets the timer T. The timeout duration is, however, shorter than in the case of the TCP protocol, since the timeout period for UDP depends on the application; it therefore depends on the malware. In general, the timeout period is of the order of a few seconds to a few tens of seconds. In the embodiment described here, the timeout duration is, for example, set to 10 seconds.

In step E11 of sending data, implemented on the timeout of the timer T, the security server 22 pseudo-randomly generates a single byte of data and sends a message including the generated byte to the infected computer 10. In one embodiment, and when this is authorized by the network, step E11 of sending data may be implemented by indicating in the IP header of the data packet that the IP message which includes the sent packet is fragmented. The fragmentation of IP packets is standardized and described in RFC791. It indicates that an IP message is incomplete. Thus, an item of equipment that receives a fragmented IP packet is placed in waiting for the following IP packets for a duration of 1 to 2 minutes, then it reassembles the message from the received packets before presenting it to an application, here the malware. This mechanism thus enables the infected computer 10 to be artificially maintained in a waiting state on the UDP protocol. This improves the effectiveness of the method in the case of the UDP protocol.

Steps E10 and E11, as for the TCP protocol, are repeated.

It is noted that the effectiveness of the attack prevention method is based, in the case of the TCP protocol, on standard features of the protocol. In the case of UDP, the effectiveness of the method depends on the implementation of the malware, accordingly it is more variable.

While most malware uses the TCP and HTTP protocols for communicating with the command server thereof, some uses proprietary protocols on the UDP protocol in order to make it difficult to detect. Thus, some known viruses use the UDP protocol on a particular port, in this case port 53, in order to conceal their traffic in legitimate DNS traffic. The embodiment based on the UDP protocol applies to this type of malware.

In the embodiments previously described, the security server 22 is independent of the DNS server 21. In the example described, the DNS server 21 stores the black list BL and responds to a DNS request relating to a domain name belonging to the black list BL by providing in response the IP address of the security server 22.

Figure 2:
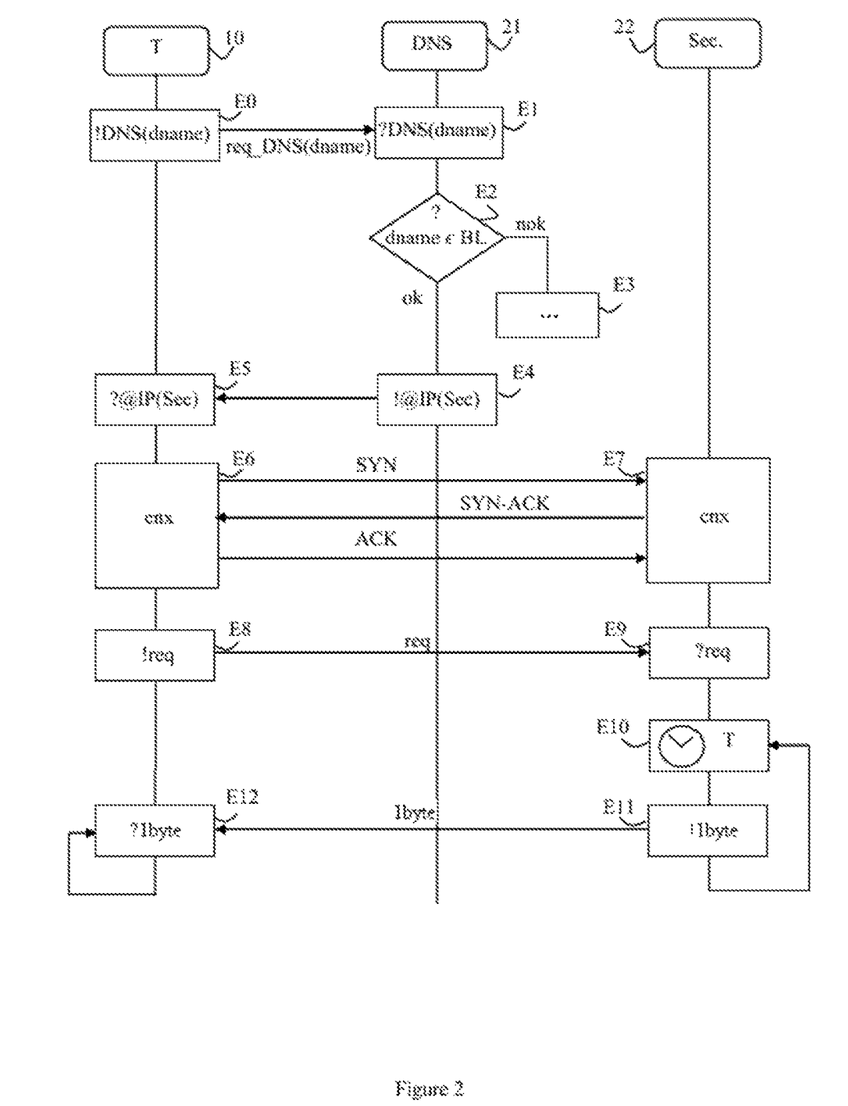
FIG. 2 depicts the steps of a method of slowing down a communication in a network, according to one embodiment.

In another embodiment, not represented, the security server 22 incorporates a DNS relay function as well as the code instructions for the implementation of steps E1 of receiving the DNS request, E2 of testing, and E3 and E4 of responding as described in relation to FIG. 2. In this case, the security server 22 is, for example, an "xDSL" ("x Digital Subscriber Line" in English)/fiber residential gateway of the IAP, intended to offer a subscribed user a plurality of services: Internet access, fixed telephony, and television. This implementation has the advantage of providing a security solution that is distributed in residential gateways and no longer centralized in a few servers. This makes attacks against security servers that implement the previously described solution difficult. Furthermore, there are cases where the malware has a black list of IP addresses embedded which includes IP addresses of machines identified as implementing security solutions. When a piece of malware is redirected to a machine the address of which appears in their black list, it rejects the communication and seeks another meeting point with the command server 20. When the security solution is distributed over residential gateways, this makes it impossible to construct a black list specific to the malware. In particular, if the malware that infects a computer of a residential network incorporates in its black list the IP address of the residential gateway on which it depends, it will no longer be able to communicate with any equipment outside the residential network. Finally, when a botnet includes computers that form part of one or more residential network(s), a security server on the network has no possibility of determining which computers are infected. Indeed, at best, it obtains information, such as the IP address of the residential gateway(s) providing the interface between the Internet and the residential network and including one or more infected computers, but it does not obtain any information on the infected computer or computers. By incorporating the security solution into the residential gateways, the infected computers can be identified.

Figure 3:
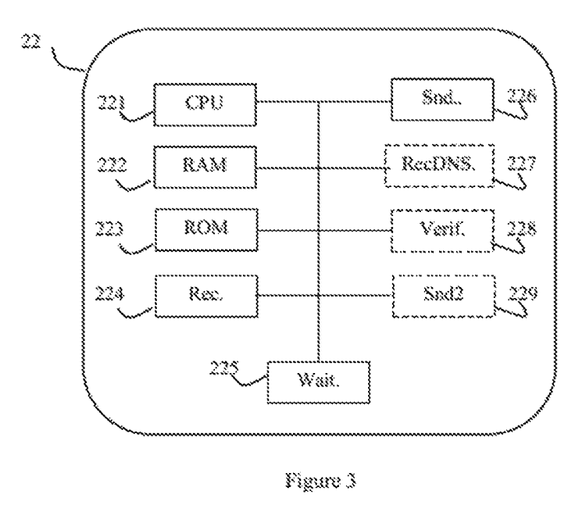
FIG. 3 is a schematic representation of a security server, according to one embodiment of the invention.

A security server 22, according to one embodiment of the invention, will now be described in relation to FIG. 3.

The security server 22 is an item of equipment on the network. It is a computer device that includes:
  a microprocessor 221, or "CPU" ("Central Processing Unit" in English), intended to load instructions into memory, to execute them, and to perform operations;
  a set of memories, including a volatile memory 222, or "RAM" (for "Random Access Memory") used for executing code instructions, storing variables, etc., a storage memory 223 of the "ROM" or "EEPROM" ("Read Only Memory" and "Electronically-Erasable Programmable Read-Only Memory" in English) type. The storage memory 223 is arranged for storing an application that includes code instructions for implementing the steps of the method of preventing attacks in a network.

The security server 22 also includes the following means:
  means 224 of receiving a request to transfer data, arranged for receiving a request originating from the computer to transfer data, the reception of said request indicating that the IP address of the security server has been provided to the computer in response to a domain name resolution request including a domain name associated with the IP address of the command server, said domain name being included in a domain name black list (BL). The means 224 of receiving a request to transfer data are arranged for implementing step E9 of receiving a request to transfer data in the method previously described;

waiting means 225, arranged for waiting for a duration of less than a timeout period for a transport protocol transporting communication packets, a session being maintained during this timeout period in the event of inactivity. The waiting means are arranged for implementing step E10 of waiting in the method previously described;

packet sending means 226, arranged for sending a packet including a pseudo-randomly generated byte of data in order to maintain the session active. The sending means 226 are arranged for implementing step E11 of sending in the method previously described.

The means 224 of receiving a request to transfer data, 225 of waiting and 226 of sending are preferably software modules including software instructions for executing the steps in the method of slowing down a communication in a network as previously described.

In a second embodiment of the invention, the security server 22 is a device which includes means of resolving DNS requests as well as code instructions for implementing steps E1 of receiving a domain name resolution request, E2 of testing and E3 and E4 of responding in the method previously described. In this example, the storage memory 223 is arranged for storing a domain name black list BL. In this embodiment, the security server 22 includes the following means, represented in dotted lines in FIG. 3:

means 227 of receiving a domain name resolution request, arranged for receiving a domain name resolution request, means of verifying 228, arranged for verifying that the requested domain name belongs to a domain name black list, and address sending means 229, arranged for sending, in response to the request, the IP address of the security server.

The means of receiving 227, of verifying 228 and the second means of sending 229 are preferably software modules.

In this embodiment, the security server 22 is, for example, an item of cut-off equipment between the infected computers and the Internet. In one embodiment, the security server 22 is a residential gateway that includes a DNS relay. In another embodiment, the security server 22 is an applicative firewall that incorporates a DNS relay function.

An exemplary embodiment of the invention overcomes shortcomings/drawbacks of the prior art and/or makes improvements thereto.

Although the present disclosure has been described with reference to one or more examples, workers skilled in the art will recognize that changes may be made in form and detail without departing from the scope of the disclosure and/or the appended claims.

The invention claimed is:

1. A method comprising:
slowing down a communication in a network including at least one computer, said computer including malware aimed at establishing a communication with a command server, wherein slowing down comprises the following acts implemented by a security server on the network:
reception of a request to transfer data originating from the computer, said reception indicating that an Internet Protocol (IP) address of the security server has been provided to the computer in response to a domain name resolution request including a domain name associated with the IP address of the command server, said domain name being included in a domain name black list,
waiting for a duration of less than a timeout period for a transport protocol transporting communication packets, a session being maintained during this timeout period in the event of inactivity, and
sending to the computer a packet including a pseudo-randomly generated byte of data in order to maintain the session active.

2. The method as claimed in claim 1, including at least one iteration of the acts of waiting and sending a packet until closure of the session by the computer.

3. The method as claimed in claim 1, further including:
receiving a domain name resolution request,
verifying that the requested domain name belongs to the domain name black list,
sending, in response to the request, the IP address of the security server.

4. The method as claimed in claim 1, in which the request to transfer data is compliant with the TCP protocol.

5. The method as claimed in claim 4, in which the duration is between one and two minutes.

6. The method as claimed in claim 1, in which the request to transfer data is compliant with the UDP protocol.

7. The method as claimed in claim 6, in which the packet sent in the course of the step of sending includes a header having a field indicating that an IP fragmentation is implemented.

8. A security server on the network, configured to slow down a communication in a network including at least one computer, said computer including malware aimed at establishing a communication with a command server, said security server including:
means of receiving a request to transfer data, arranged for receiving a request to transfer data originating from the computer, the reception of said request indicating that an Internet Protocol (IP) address of the security server has been provided to the computer in response to a domain name resolution request including a domain name associated with the IP address of the command server, said domain name being included in a domain name black list,
waiting means, arranged for waiting for a duration of less than a timeout period for a transport protocol transporting communication packets, a session being maintained during this timeout period in the event of inactivity,
packet sending means, arranged for sending to the computer a packet including a pseudo-randomly generated byte of data in order to maintain the session active.

9. The security server as claimed in claim 8, including:
means of receiving a domain name resolution request, arranged for receiving a domain name resolution request,
means of verifying, arranged for verifying that the requested domain name belongs to a domain name black list,
address sending means, arranged for sending, in response to the request, the IP address of the security server.

10. A residential gateway on the network including a security server as claimed in claim 9.

11. A non-transitory computer-readable data medium comprising a computer program recorded thereon and configured to be installed in a memory of a security server, including instructions for slowing down a communication in a network including at least one computer, when the program is executed by a processor of the security server, said computer including malware aimed at establishing a communication with a command server, wherein the instructions configure the security server on the network to perform acts of:

receiving a request to transfer data originating from the computer, said receiving indicating that an Internet Protocol (IP) address of the security server has been provided to the computer in response to a domain name resolution request including a domain name associated with the IP address of the command server, said domain name being included in a domain name black list,     waiting for a duration of less than a timeout period for a transport protocol transporting communication packets, a session being maintained during this timeout period in the event of inactivity, and     sending to the computer a packet including a pseudo-randomly generated byte of data in order to maintain the session active.

* * * * *